Patented Sept. 19, 1950

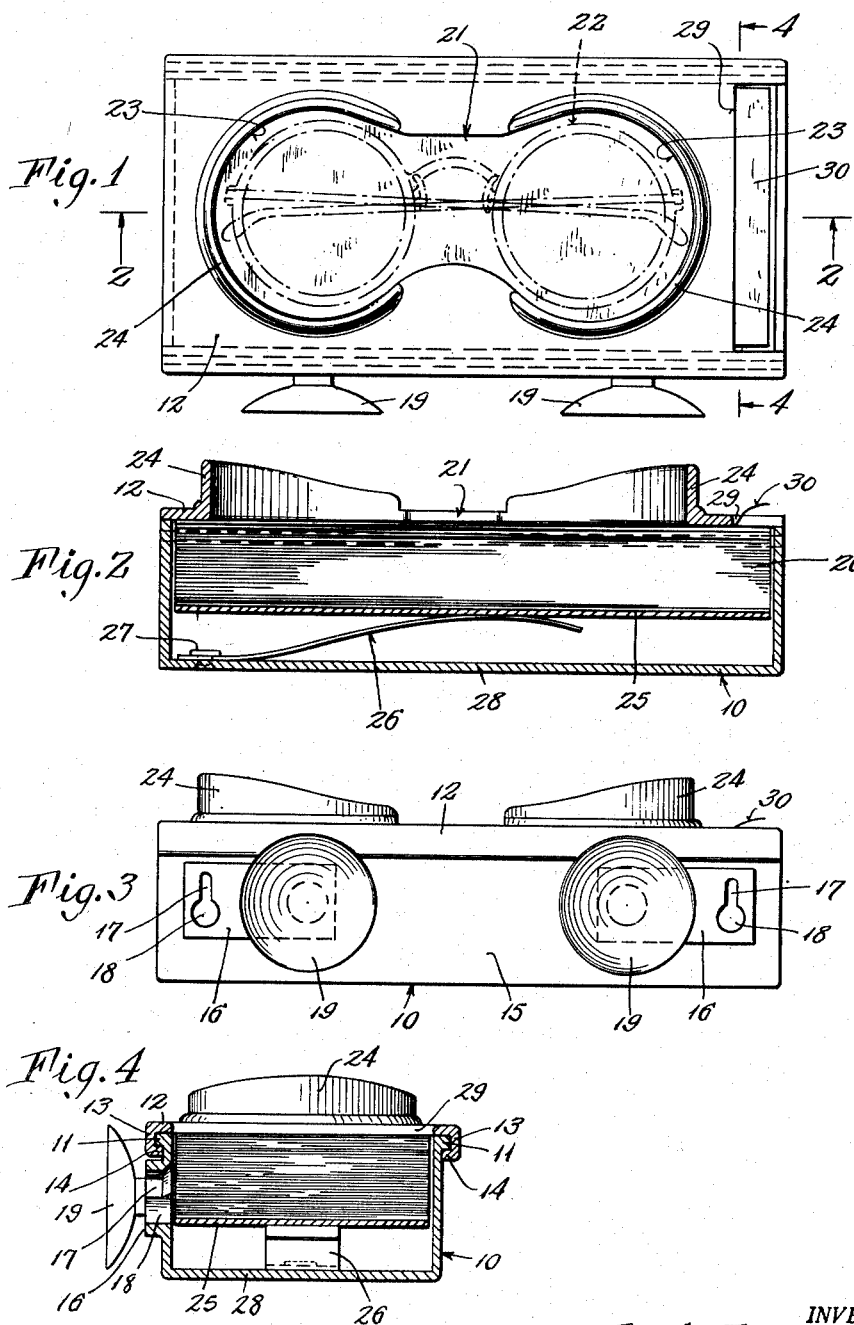

2,522,909

UNITED STATES PATENT OFFICE 2,522,909

EYEGLASS HOLDER AND TISSUE DISPENSER

Fred F. Wadanoli, Bridgeport, Conn.

Application January 30, 1948, Serial No. 5,341

6 Claims. (Cl. 312—61)

This invention relates to stationary receptacles for temporarily holding eyeglasses, spectacles and the like.

An object of the invention is to provide an improved, stationary, combination receptacle and tissue dispenser for temporarily holding eyeglasses and the like, the said combination device being particularly adapted for use in barber shops, hair dressing salons etc. and being arranged to provide a clean and soft, non-scratching supporting surface to conveniently receive and subsequently release the eyeglasses, the means providing said surface being preferably removed and replaced after each use, and being then available for use as a wiper to clean the eyeglass lenses, and finally disposable.

Another object of the invention is to provide an improved receptacle and dispenser as above which is extremely simple and economical in construction, and reliable in operation.

A further object of the invention is to provide an improved device of the above type which may without tools or difficulty be easily and quickly secured to supporting surfaces such as are usually found in barber shops, beauty parlors, etc.

Still another object of the invention is to provide an improved combination receptacle and dispenser which is arranged to enable a pair of eyeglasses to be easily and quickly placed thereon and removed therefrom, while at the same time effectively guarding against the eyeglasses inadvertently falling out of the device and becoming damaged.

In accomplishing the above objects there is provided by the invention, in the specific embodiment thereof illustrated herein, a generally flat or low housing having at one side mounting means in the form of rubber suction cups and also slotted brackets whereby it may be easily and quickly secured to a wall surface such as a mirror, tile, or upright glass plate, or to a wainscoting or trim into which screws have been fastened. The housing or container has a cover which is easily and quickly removable and replaceable, and is adapted to carry a pack of zig-zag or otherwise folded tissues. The pack of tissues is supported on a loose plate which is spring-urged upward whereby, as the top tissues are removed from the container, the remaining tissues are held upward against the underside of the cover. The cover is provided with an aperture in the shape of a pair of eyeglasses, thereby to expose the uppermost tissues of the pack and to enable a pair of glasses to be placed in the opening of the cover and on the said tissues. Also, the cover has upstanding flanges adjacent the eye-glass receiving aperture, which act as guards and prevent the eyeglasses from inadvertently falling out of the cover. In addition, a dispensing opening is provided in the cover whereby the uppermost tissues of the pack may be withdrawn or removed one at a time.

In using the device, a pair of eyeglasses is placed in the opening of the cover to rest on the uppermost tissue of the pack, which thereby provides a soft and non-scratching supporting surface for the eyeglasses. When the eyeglasses are again removed from the receptacle, the uppermost tissue may be withdrawn through the dispensing opening and used to clean the lenses of the eyeglasses, and this automatically presents a fresh clean tissue in the opening of the cover of the receptacle, in readiness for receiving the next pair of eyeglasses. When all of the tissues in the receptacle have been removed and consumed, the cover may be easily removed to install a new pack of tissues.

Other features and advantages will hereinafter appear.

In the accompanying drawings:

Figure 1 is a top or plan view of the improved combination receptacle and dispenser device of the invention.

Fig. 2 is a vertical section taken on line 2—2 of Fig. 1.

Fig. 3 is a rear elevational view of the device, and

Fig. 4 is a vertical transverse section taken on line 4—4 of Fig. 1.

As shown, the improved receptacle and dispenser device comprises a boxlike housing or casing 10 which is substantially of rectangular shape and relatively low as compared with its width and length, the casing being open at the top and having exterior longitudinally extending flanges 11 along its front and rear top edges, Fig. 4.

A slidable cover 12 is provided for the casing 10, the said cover having depending flanges 13 with inturned portions 14 which are cooperable with the casing flanges 11 to enable the cover to be slid longitudinally off and on the casing, and to be securely retained against inadvertent removal.

The rear wall 15 of the casing is provided with mounting means for enabling it to be easily and quickly supported on a vertical surface such as a mirror, section of tile, glass plate, wainscoting or trim. This mounting means comprises portions 16 which are formed in the wall 15 to be integral therewith and which are offset outwardly as shown in Figs. 3 and 4. The portions 16 have vertically extending slots 17 provided with enlarged ends 18 to receive the heads and shanks of screws or nails which may be secured in the wainscoting, trim or other supporting wall surface or the like. Also, the mounting portions 16 may have secured to them, by any suitable means such as screws (not shown), suction cups 19 which may be used to mount the casing 10 on a tile or glass or other non-porous vertical supporting surface.

If desired the suction cups 19 may be unscrewed from the mounting portions 16 of the casing 10, thereby to enable the said portions to engage the supporting surface directly in the event that screws or nails are used in the supporting surface, which enter the slots 17. Or, the suction cups 19 may be retained on the mounting portions 16 even though screws or nails are used to mount the casing, in which event the suction cups will engage the supporting surface and provide for a yieldable mounting.

In accordance with the invention a pack 20 of cleansing tissues or the like is supported in the casing 10 against the underside of the cover 12 thereof, and the cover is provided with a novel opening 21 shaped to receive a pair of eyeglasses or spectacles 22, Fig. 1 whereby the top tissues of the pack 20 are exposed through the cover 12 and the eyeglasses 22 may rest on the said top tissues. As shown, the opening 21 in the cover 12 is of elongate shape, having enlarged circular end portions 23 and a portion of reduced width intermediate the end portions. The enlarged end portions of the opening 21 in the cover 12 are surrounded by upstanding flanges 24 which are preferably formed integral with the cover 12 and which serve as guards to prevent the spectacles from falling out of the opening 21 in the cover.

For the purpose of maintaining the pack 20 of tissues in a raised position in the casing 10 and against the underside of the cover 12, a plate 25 is provided, to be loosely held in the casing, the said plate being spring-urged upward by a leaf spring 26 secured at one end by a rivet 27 to the bottom 28 of the casing.

To enable the topmost tissues of the pack 20 to be withdrawn one at a time, a dispensing recess 29 is provided in the cover 12, extending transversely thereof adjacent one end of the cover, and the uppermost tissue 30 of the pack 20 is shown as projecting upwardly through the dispensing opening 29 as seen in Figs. 1 and 2.

The operation of the improved receptacle and dispenser device is as follows: When a customer enters the barber shop or other establishment, he may remove his spectacles and place them in the opening 21 of the receptacle, on the uppermost tissue 30 of the pack 20. At the time that the customer is ready to leave he removes his spectacles from the receptacle and at the same time may pull out the uppermost tissue 30 therefrom and use this tissue to wipe and clean the lenses of the spectacles. The removal of the uppermost tissue 30 will automatically expose the next tissue in the opening 21 of the cover 12, thereby presenting a fresh, clean and soft surface for receiving the next pair of spectacles.

When a new pack of tissue is placed in the casing 20, the cover 12 is applied while holding the pack down with one hand, and this may be done conveniently by reaching through the opening 21 in the cover as the cover is slid on.

Variations and modifications may be made within the scope of this invention and portions of the improvements may be used without others.

I claim:

1. A combination eyeglass receptacle and tissue dispenser comprising a casing adapted to carry a pack of cleansing tissues, said casing having a top provided with an aperture shaped to receive broadside a pair of eyeglasses; and means in said casing for maintaining a pack of tissues carried thereby in a raised position in the casing and against the underside of the casing top regardless of the thickness of said pack.

2. A combination eyeglass receptacle and tissue dispenser comprising a casing adapted to carry a pack of cleansing tissues, said casing having a top provided with an aperture shaped to receive broadside a pair of eyeglasses, and provided with a recess through which tissues may be withdrawn from the top of a pack carried in the casing; and means in said casing for maintaining said pack of tissues in a raised position in the casing and against the underside of the casing top regardless of the thickness of said pack.

3. A combination eyeglass receptacle and tissue dispenser comprising a casing adapted to carry a pack of cleansing tissues; a top removably secured to the casing, said top having an aperture shaped to receive broadside a pair of eyeglasses; and means in said casing for maintaining a pack of tissues carried thereby in a raised position in the casing and against the underside of the casing top regardless of the thickness of said pack.

4. A combination eyeglass receptacle and tissue dispenser comprising a casing adapted to carry a pack of cleansing tissues; a top removably secured to the casing, said top having an aperture shaped to receive broadside a pair of eyeglasses, and having a dispensing recess to enable the top tissues from said pack to be withdrawn; and means in said casing for maintaining said pack of tissues in a raised position in the casing and against the underside of the casing top regardless of the thickness of said pack.

5. A combination eyeglass receptacle and tissue dispenser comprising a casing adapted to carry a pack of cleansing tissues, said casing having a top provided with an aperture shaped to receive broadside a pair of eyeglasses; upstanding flanges on the top of the casing adjacent the said aperture therein, for preventing a pair of spectacles from inadvertently falling out of said aperture; and means in said casing for maintaining a pack of tissues in a raised position in the casing and against the underside of the casing top regardless of the thickness of said pack.

6. A combination eyeglass receptacle and tissue dispenser comprising a casing adapted to carry a pack of cleansing tissues; a top removably secured to the casing, said top having an aperture shaped to receive broadside a pair of eyeglasses, and said top having upstanding flanges adjacent the aperture therein to prevent a pair of eyeglasses from inadvertently falling out of said aperture; and means in said casing for maintaining a pack of tissues in a raised position in the casing and against the underside of the casing top regardless of the thickness of said pack.

FRED F. WADANOLI.

No references cited.